United States Patent [19]

Boros et al.

[11] 4,309,650

[45] Jan. 5, 1982

[54] AVERAGE CURRENT CONTROLLED SWITCHING REGULATOR UTILIZING DIGITAL CONTROL TECHNIQUES

[75] Inventors: Victor B. Boros, New York; James N. Giacopelli, Maspeth, both of N.Y.; Thomas V. Papathomas, Chatham, N.J.

[73] Assignee: Bell Telephone Laboratories, Incorporated, Murray Hill, N.J.

[21] Appl. No.: 49,593

[22] Filed: Jun. 18, 1979

[51] Int. Cl.³ .............................................. H02P 13/32
[52] U.S. Cl. .................................... 323/283; 323/285
[58] Field of Search .................. 323/4, 17, 20, 22 T, 323/DIG. 1, 282, 283, 285; 363/124

[56] References Cited

U.S. PATENT DOCUMENTS

| | | | |
|---|---|---|---|
| 3,536,987 | 10/1970 | Muchnick | 323/17 X |
| 4,002,963 | 1/1977 | Hunter | 321/18 |
| 4,039,897 | 8/1977 | Dragoset | 323/20 X |
| 4,095,165 | 6/1978 | Boros | 323/17 |
| 4,109,194 | 8/1978 | Miller | 323/17 |
| 4,146,832 | 3/1979 | McConnell | 323/17 |
| 4,148,097 | 4/1979 | Deisch | 363/26 |

*Primary Examiner*—A. D. Pellinen
*Attorney, Agent, or Firm*—Alfred G. Steinmetz

[57] ABSTRACT

A current controlled switching type voltage regulator achieves voltage regulation by controlling an average current flow through the switching device. This current is sensed and transformed into a signal frequency. The signal frequency is counted to determine its average value and this count is compared to a variable current reference count which is continuously adjusted in response to an output voltage monitor which includes circuitry to generate an error count responsive to the deviation of the voltage output from a desired regulated value. In order to counteract instability problems inherent in current controlled switching type voltage regulators the transducer converting current into a signal frequency has a threshold characteristic to insure a definite fixed signal frequency at very low currents.

6 Claims, 3 Drawing Figures

AVERAGE CURRENT CONTROLLED SWITCHING REGULATOR UTILIZING DIGITAL CONTROL TECHNIQUES

BACKGROUND OF THE INVENTION

1. Field of the Invention

This invention relates to switching voltage regulators utilizing pulsewidth modulated control of the switching device. It is particularly concerned with a switching voltage regulator utilizing digital type average current control techniques.

In typical existing peak current control systems for control of switching voltage regulators, current passing through the power switching transistors is monitored on an instantaneous basis. As the current through the switching transistor increases its instantaneous magnitude is continuously compared with a particular current threshold reference value. When the current threshold value is reached, the switching transistor is biased nonconducting. The current threshold value establishing the turn-off time of the switching transistor is controlled by a voltage feedback circuit which operates to control the output voltage of the switching regulator.

Controlling the output voltage of a switching regulator or converter circuit by peak current control advantageously permits fast current limiting and eliminates an occurrence of possible damage to the switching transistor from short circuits occurring at the output of the regulator. A typical analog type peak current control system applied to a converter circuit is disclosed in U.S. Pat. No. 4,148,097 issued to C. W. Deisch on Apr. 3, 1979 and assigned to the same assignee as this application.

Peak current control as previously utilized has limitations. For example, by monitoring the instantaneous value of the switching transistor current, the regulation circuitry is rendered very susceptible to transient variations of this current, such as ringing at the initial turn-on of the switching transistor. In addition under certain operating conditions, the peak current control becomes unstable. These conditions are generally related to the slope and duration of current increase through the switch within a given switching period.

BRIEF SUMMARY OF THE INVENTION

These problems are solved in accord with the principles of the present invention by controlling the switching transistor in response to the average value of the current flowing through the switching transistor instead of the instantaneous value of current. The average value is obtained through the use of digital techniques whereby a sensed current magnitude is converted by an amplitude-to-frequency converter into a signal frequency which is periodically counted, the count represents the average value of the current flowing through the switching device. An average current reference threshold is varied in response to deviations of an output voltage from a desired value. Comparison of the average current in the switching device with the average current reference determines the conduction interval of the switching device. This particular arrangement is advantageously resistant to current transients occurring either at the beginning or during any portion of the conduction interval of the switch. This average current control technique furthermore does not experience the instability problems inherent in the peak current control technique. This advantage is achieved by operating the amplitude-to-frequency converter with a residual signal frequency that exists at zero current flow through the switching transistor.

BRIEF DESCRIPTION OF THE DRAWINGS

The principles of the invention may be readily ascertained by reference to the following description and the accompanying drawing in which.

DETAILED DESCRIPTION

Figure 1:
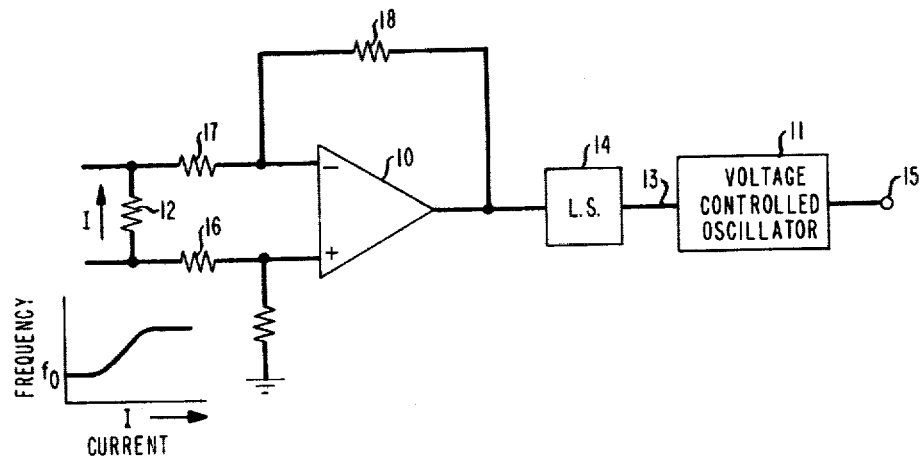
FIG. 1 is a current-to-frequency transducer which may be used with the present invention.

A current magnitude to signal frequency converter, as shown in FIG. 1, utilizes an operational amplifier 10 in combination with a conventional voltage controlled oscillator 11 to convert a voltage sensed across the current sensing resistance 12, located in the current path of the switching transistor, into a proportional signal frequency at the output 15 of the voltage controlled oscillator 11. Operational amplifier 10 is connected to shunt sensing resistor 12 with its two equal input resistors 16 and 17. Feedback resistor 18 is equal in resistance to the two equal input resistors 16 and 17. A voltage level shifter 14 raises the output of the operational amplifier 10 to a voltage level appropriate to drive the voltage controlled oscillator 11. It is apparent to those skilled in the art that the output voltage of the voltage level shifter 14 on lead 13, coupled to the voltage controlled oscillator 11, is a function of the instantaneous current magnitude flowing through the sensing resistor 12. The output of voltage controlled oscillator 11 is a signal frequency proportional within a predefined range of current to the value of current flowing through sensing resistor 12. As is evident from the current frequency diagram associated with FIG. 1, the current-to-frequency transducer has a residual frequency level $f_o$. This residual frequency $f_o$ contributes to the inherent stability of the current controlled voltage regulator as disclosed hereinbelow.

Figure 2:
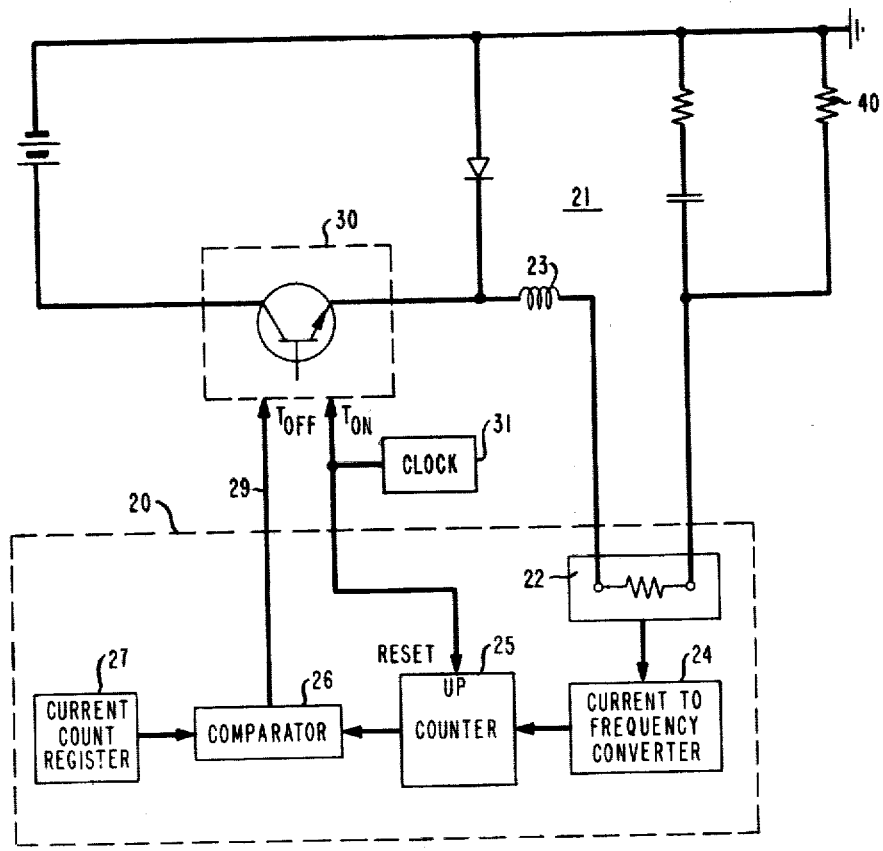
FIG. 2 illustrates an average current control feedback circuit of a switching regulator according to the present invention.

A current feedback circuit 20 operative in accord with the principles of the invention, is shown in FIG. 2. It includes a sensing device 22 positioned to sense current flow through the filter inductor 23 of the switching regulator 21. A voltage generated by sensing device 22 is applied to a current-to-frequency converter 24, such as is shown schematically in FIG. 1, which in turn is coupled to an up counter 25 which is periodically reset by clock 31 as the switch 30 is biased conducting. An accumulating output count of the counter 25 is continuously compared by a comparator 26 with a reference count contained in a current reference count register 27. When the accumulating count in the counter 25 equals the reference count, the comparator 26 generates a signal on lead 29 which biases the switch transistor 30, into nonconducting state.

A typical cycle of operation of the switching regulator, as shown in FIG. 2, begins when the clock 31 periodically generates a pulse which biases the transistor switch 30 into a conducting condition and resets the counter 25. Current flows through the transistor switch 30 to the load 40 through the output filter inductor 23. Sensing device 22 monitors the current flow and generates a voltage which is applied to the current controlled oscillator 24. Current-to-frequency converter 24 generates a signal whose frequency is proportional to the current flow through the sensing device 22. Counter 25 counts this signal frequency output with the accumulating count continuously applied to comparator circuit 26 which terminates conduction in transistor switch 30 as described above.

Figure 3:
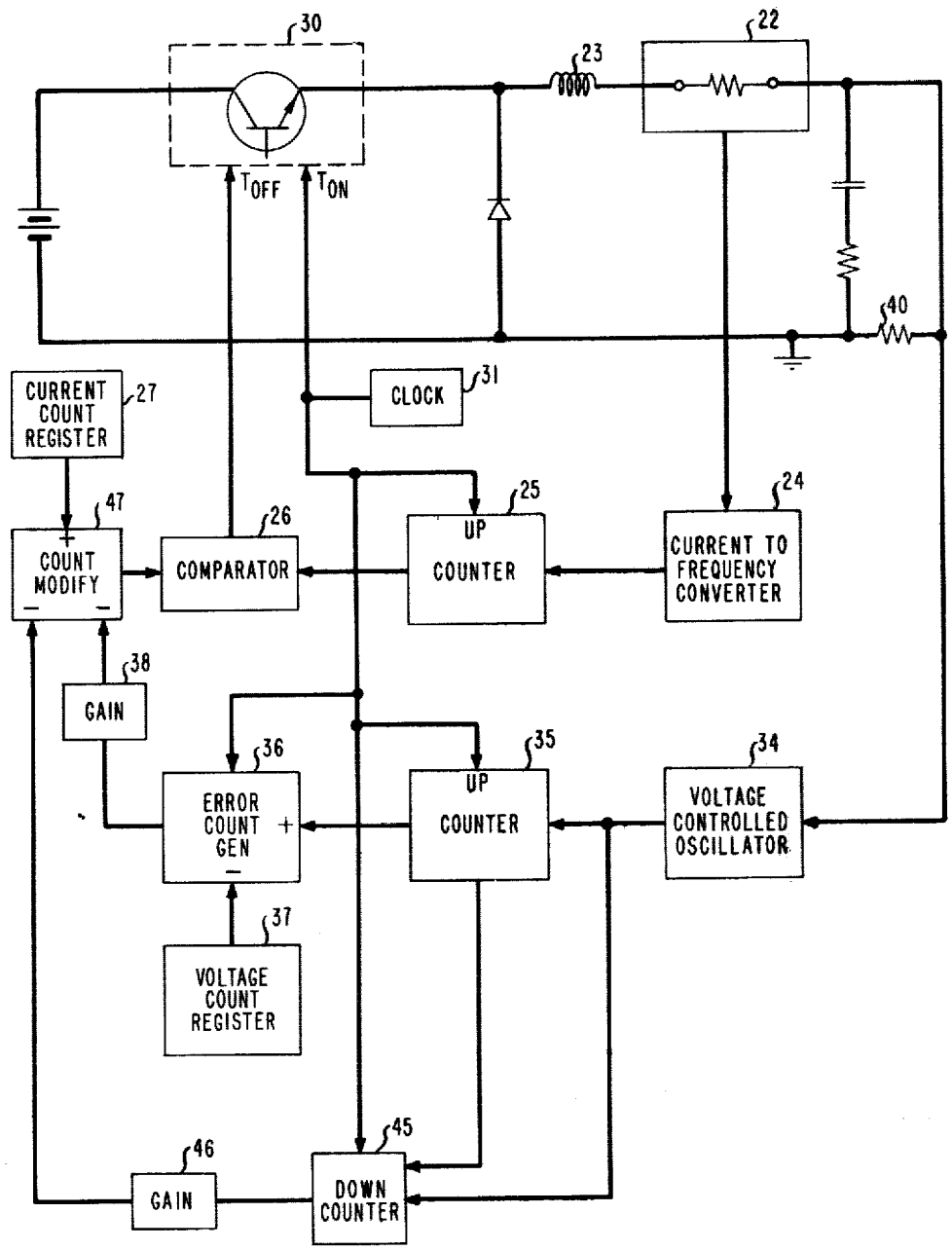
FIG. 3 discloses a digitally controlled voltage regulator utilizing average current control to achieve voltage regulation in accord with the principles of the invention.

The switching regulator, disclosed in FIG. 3, achieves voltage regulation of the output via control of the average inductor current. Conventional switching type voltage regulators operate by modulating a conduction interval of the switching transistor in response to an error voltage signal derived by comparing the output voltage with a reference voltage value. In the voltage control disclosed herein the transistor switch current is monitored with digital circuitry to determine its average value. A digital signal proportional to the average current is compared with a digital reference. This digital reference is modified in response to a digital error signal generated in response to a voltage output of the regulator. The added digital control circuitry shown in FIG. 3 includes a voltage proportional feedback circuit and a derivative feedback circuit. Both feedback circuits cooperate to modify the current reference count so that the switching regulator is operated as a voltage regulator by controlling the average filter inductor current.

The current proportional feedback circuit operates substantially as described hereinabove with reference to FIG. 2. The current flowing through the output filter inductor 23 is sensed by sensing device 22 and applied to the current-to-frequency converter 24. The signal frequency output is counted by the counter 25 which is periodically reset by clock 31. This accumulating count is compared by comparator circuit 26 with a current reference count which is modified as described herein by the proportional and derivative voltage feedback circuit.

The proportional voltage feedback circuit includes a voltage controlled oscillator 34 responsive to the output voltage across the load 40 of the switching regulator. Voltage controlled oscillator 34 generates a signal frequency proportional to the magnitude of the output voltage of the regulator. This signal frequency is counted by up counter 35 which is periodically reset each period by the clock 31. The accumulating output of the counter 35 is continuously arithmetically summed in subtract circuit 36 with a voltage reference count contained in register 37. The counter 35 is run for the entire cycle of operation of the switching regulator encompassing both the conducting and nonconducting periods of the switch 30. The voltage reference count in register 37 is a count which would be reached by the counter 35 over an entire cycle of operation if the output voltage of the regulator was exactly the desired value.

The count accumulated in the counter 35 over each cycle of operation is subtracted in subtract circuit 36 from the voltage reference count in register 37 in response to a periodic timing signal supplied by clock 31. The resulting error count is applied through a gain control circuit 38 to a count modifying or subtract circuit 47 which is used to modify the current reference count contained in reference count register 27. This error count is subtracted from the basic reference count to modify the current reference level.

The count modifying circuit 47 may be a subtract circuit or it may advantageously comprise an up/down counter or other suitable means of modifying the current reference count. Count modifying circuit 47 combines the error count with the current reference count to establish a new current level control count in order to regulate the output voltage of the regulator. The error count modifies the current level count in response to changes in the output voltage of the regulator. It is readily apparent that should the output voltage increase beyond its desired value, the increased error count will be utilized to reduce the current level reference count and counter 25 will accumulate a count equaling the adjusted current level reference count more rapidly than normally. This decreases the on time of the transistor switch 30 during which it conducts, and reduces the output voltage.

In addition to the voltage proportional feedback circuit, a derivative feedback circuit is added to improve the dynamic performance of the overall feedback circuit. The derivative function is obtained in down counter 45 by decrementing in each cycle of operation the accumulated count of a previous cycle generated by the counter 35 in the proportional feedback circuit. This accumulated count is inserted into the down counter 45 in response to a timing signal supplied by clock 31 and in a subsequent cycle is counted down in response to the signal frequency output of the voltage controlled oscillator 34 included in the proportional feedback circuit. The resulting difference count is applied to a gain function circuit 46 which may simply comprise hardware wired digit shifting arrangements to obtain a desired gain. The derivative term with gain is applied from thence to the count modifying circuit 47 to modify the basic current reference count in accord with the derivative count.

As is seen from the foregoing example of average current control, a switching regulator can obtain voltage regulation through current control without extensive filtering in the current sense circuitry to avoid undesirable transient responses. This average current control circuit is additionally inherently stable due to the residual frequency of the current-to-frequency converter; hence no need exists for additional circuitry to achieve stability, as in the case of peak current control. Various other implementations of the principles of this invention will be readily apparent to those skilled in the art without departing from the spirit and scope of the invention.

We claim:

1. A current controlled switching type voltage regulator including input means;
    output means, switching means coupling said input and output means;
    clock means for periodically initiating conduction in said switching means;
    current sensing means coupled to sense a current proportional to current flow through said switching means;
    a current-to-digital transducer coupled to said current sensing means and generating a signal frequency proportional to a current magnitude sensed therein;
    the current-to-digital transducer comprising:
    an operational amplifier having positive and negative input leads shunted across a sensing resistor included in said current sensing means and located in a path of a current being sensed and a feedback resistor equal in magnitude to the positive and negative input resistances to said operational amplifier; and a voltage controlled oscillator responsive to an output voltage of the operational amplifier;

said current-to-digital transducer constructed to operate with a residual signal frequency output below a predetermined threshold current level;

first counting means responsive to an output of said current-to-digital transducer means operative to derive a number proportional to an average of the current flow through said switching device;

a current reference count register;

means for modifying a reference count in said current reference count register, means for comparing a count in said first counting means with a count output of said means for modifying a reference count;

a voltage-to-digital transducer responsive to a voltage at said output means, second counting means coupled to respond to said voltage-to-digital transducer; and a voltage reference count register, difference means for generating an error count in response to comparing a count of said second counter accumulated during a complete period of said clock means with a count output of said voltage reference count register, said error count being coupled to said means for modifying a count in said current reference count register whereby a count output of said first counter is compared with a count output of said means for modifying a reference count in order to control a conduction interval of said switching means in order to regulate a voltage output by controlling current through said switching means.

2. A current switching controlled type voltage regulator as defined in claim 1 wherein a final accumulated count output over a single cycle of said second counter is transferred to a down counter at a start of a subsequent cycle of operation and the transferred count contained in said down counter being counted down by a signal frequency of said voltage-to-digital transducer during the subsequent cycle of operation, the resulting differential count being applied to said means for modifying in order to modify said current reference count.

3. A current controlled switching type voltage regulator comprising:

input means, output means, and switching means coupling said input and output means;

clock means for periodically initiating conduction in said switching means;

current sensing means coupled to sense current flow through said switching means;

current-to-signal frequency conversion means responsive to said current sensing means said current-to-signal frequency conversion means constructed to have an operative characteristic so as to produce a residual signal frequency output when current sensed by said current sensing means falls below a preset threshold current level, first counting means responsive to said current-to-signal frequency conversion means to derive a count proportional to an average of the current flow through said switching means;

a voltage-to-signal frequency conversion means coupled to sense a voltage at said output means;

second counting means responsive to said voltage-to-signal frequency conversion means;

a voltage reference count register, subtraction means responsive to said voltage reference count register and said second counting means for generating an error count; and a current reference count register, count modifying means coupled to modify a count output of said current reference count register in response to said error count and comparator means coupled to compare a count output of said count modifying means with an accumulating count in said first counter whereby conduction in said switching means is terminated in response to a count equality detected by said comparator.

4. A current controlled switching type voltage regulator as defined in claim 3 and further including means for deriving a count responsive to a derivative of a voltage at said output means.

5. A current controlled switching type voltage regulator as defined in claim 4 wherein said means for deriving a count includes a down counter coupled to be decremented by said voltage-to-signal frequency conversion means.

6. A current controlled switching type voltage regulator as defined in claim 5 wherein said current-to-signal frequency conversion means includes an operational amplifier responsive to said current sensing means and coupled through a level shifter to drive a voltage controlled oscillator whereby a minimum output signal frequency is generated at very low currents in said current sensing means.

* * * * *